United States Patent
Kong et al.

(10) Patent No.: US 7,255,785 B2
(45) Date of Patent: Aug. 14, 2007

(54) APPARATUS AND PROCESS FOR TREATMENT OF WASTE OILS

(76) Inventors: Henry Kong, 402 Chowon Villa, 389 Yangjae2-dong, Seocho-gu, Seoul 137-899 (KR); Charlie Jeong, 8768-189, St. Edmonton, AB (CA) T5T 6C4

(*) Notice: Subject to any disclaimer, the term of this patent is extended or adjusted under 35 U.S.C. 154(b) by 436 days.

(21) Appl. No.: 10/743,100

(22) Filed: Dec. 23, 2003

(65) Prior Publication Data

US 2005/0133412 A1    Jun. 23, 2005

(51) Int. Cl.
*C10G 9/00* (2006.01)
*C10M 175/00* (2006.01)

(52) U.S. Cl. .................. 208/106; 208/179; 208/184

(58) Field of Classification Search ............... 208/106, 208/179, 184
See application file for complete search history.

(56) References Cited

U.S. PATENT DOCUMENTS 5,271,808 A   12/1993   Shurtleff
5,286,349 A    2/1994   Shurtleff
5,871,618 A    2/1999   Lee et al.
6,132,596 A   10/2000   Yu

*Primary Examiner*—Glenn Caldarola
*Assistant Examiner*—John Douglas
(74) *Attorney, Agent, or Firm*—Oliff & Berridge, PLC

(57) ABSTRACT

An apparatus and a process for reclaiming fuel oils from waste oils. The apparatus and process is characterized in that waste oils are thermally cracked by combination of high pressure and vacuum in a sequence at high temperature. However, rapid thermal cracking is performed at even lower temperature of 300~350° C. than at 400~450° C. of conventional batch method. The semi-continuous method with bleeding process is employed and accordingly no pause stage becomes necessary to physically collect ash cake from the thermal cracking vessel as experienced from the conventional batch process. The ash cake contents drops from 5% of conventional method to 1.4% since slow reaction is a cause for oxidation problem which is related with formation of tar compounds and production rate of #2 diesel fuel oil increases 3 times more than batch process.

4 Claims, 4 Drawing Sheets

APPARATUS AND PROCESS FOR TREATMENT OF WASTE OILS

BACKGROUND OF THE INVENTION

1. Field of the Invention

The present invention relates generally to waste oil treatment, and more particularly, to an apparatus and process for reclaiming fuel oils from waste oils.

2. Related Art

Waste engine oil and lubricating oil from industry are environmentally hazardous and cause disposal problem. They are collected by public service agency and transferred to commercial station where the oils are reprocessed by centrifugation and filtration and are sold as recycled lubricating oil. Those reprocessed oil is sold for fuel source of boiler as well. The waste oil is frequently subject to thermal cracking process to make #2 diesel fuel.

Lubricating oil is produced when crude oil is subject to a certain boiling range cut of typical 300-500° C. When lubricating oil including synthetic oil performs its job in the engine compartment it usually picks up dirt and heavy metals from the metal parts of engine and from the fuels used. Therefore, typical used oil contains quite substantial amount of cadmium, chromium, zinc and lead. Long period of performance of the oils in the engine helps the lubricating oil go through depolymerization process which results in formation of short hydrocarbons of low boiling point. Procedure of removal of lubricating oil from engine entails clean-up process with solvent, detergent and water etc.

Therefore, a need exists for the development of efficient thermal cracking process to convert the used oil into useful product such as diesel fuel and reduce environmentally hazardous solid and sludge.

U.S. Pat. Nos. 5,286,349 and 5,271,808 disclose an apparatus for reclaiming useful oil products from waste oils. The description of the apparatus basically includes conventional kettle type boiler where some of the boiled material is recovered using a condenser.

FIG. 1 describes a partial diagram showing the conventional thermal cracking apparatus, which is the same as the FIG. 3 of U.S. Pat. No. 5,871,618. Referring to FIG. 1, the cracking apparatus includes a cracking vessel 101 which is comprised of a lid 106, side walls 105, a bottom and a top outlet 120. The conventional apparatus for reclaiming oil product from waste oil is described in U.S. Pat. No. 5,871,618 where open batch type of thermal pot is used at ambient pressure, which is a bit more advanced method than U.S. Pat. Nos. 5,286,349 and 5,271,808 but it still requires long warming up and reaction time. In addition the system requires pause stage for the removal of ash cake every 3.5 days which takes minimum 10 hours as shown in FIG. 2. It should be noticed in the U.S. Pat. No. 5,286,349 that application of heating to the bottom only of the vessel causes formation of sludge cake. In addition it causes different temperature zone from bottom to the top of the waste oil in the vessel, which contributes not only to poor cracking process but also to more formation of sludge cake at the bottom of the vessel.

Accordingly, in the prior art technologies, high-energy requirement, long reaction time, big reactor size and low production rate are unavoidable. Particularly the long reaction time due to large volume of feedstock entails undesirable polymerization, oxidation and dehydrogenation resulting in the production of an unstable diesel fuel and a large volume of sludge cake residues as described in the U.S. Pat. No. 6,132,596. Those shortcomings includes the employment of high temperature up to 450~500° C. which results in physical damage to the structure of cracking pot, deformation of the structure, high-energy bill and formation of unnecessary by-products such as too short hydrocarbon fragments.

SUMMARY OF THE INVENTION

An object of the present invention is to overcome and advance some disadvantages of conventional batch type of waste oil cracking process by providing a semi-continuous process and an apparatus such as combination of high-pressure and vacuum vessel.

It is a second object of the present invention to use comparatively small size of vessel to achieve the identical or better production rate due to high reaction rate at high pressure and vacuum conditions.

It is a third object of the present invention to employ comparatively low temperature of 300~350° C. to accomplish the identical or better production rate.

Another object of the present invention is to use bleeding valve at the bottom of vessel for the removal of solidifying sludge cake, which results in prevention of stopping process to scrape off the solid contaminants. Part of them is recycled back to the fresh waste oil tank.

It is preferred in the present invention that the thermal cracking vessel is pressurized up to 300 psi to accelerate the reaction time up to 3 times faster than that of conventional batch process. The high-pressure relief valve or pneumatic pressure valve linked to PLC is set to 300 psi and is connected to the inlet of distillation tower. The high-pressure rupture valve set to about 350 psi is mounted on the top of the vessel for the emergency case of excessive pressure and is connected to the safety tank. Therefore, when the waste oil starts cracking and pressure reaches 300 psi and then high-pressure relief valve opens up by means of pneumatic pressure to release the cracked oil gas to the distillation tower. This results in at least 3 times faster cracking process.

It is also preferred in the present invention that vacuuming the cracking vessel also accelerates the cracking process faster than that of conventional batch process since it lowers boiling point of cracking oil and removes much quickly cracked low molecular weight compounds from the vessel resulting in reduction of energy and time.

It is preferred in the present invention that heat is applied not only to the bottom of the vessel but also to the side of the vessel which eliminates different temperature zone in the vessel.

DETAILED DESCRIPTION OF THE PREFERRED EMBODIMENT

Preferred embodiments will be described with reference to the accompanying drawings.

Figure 1:
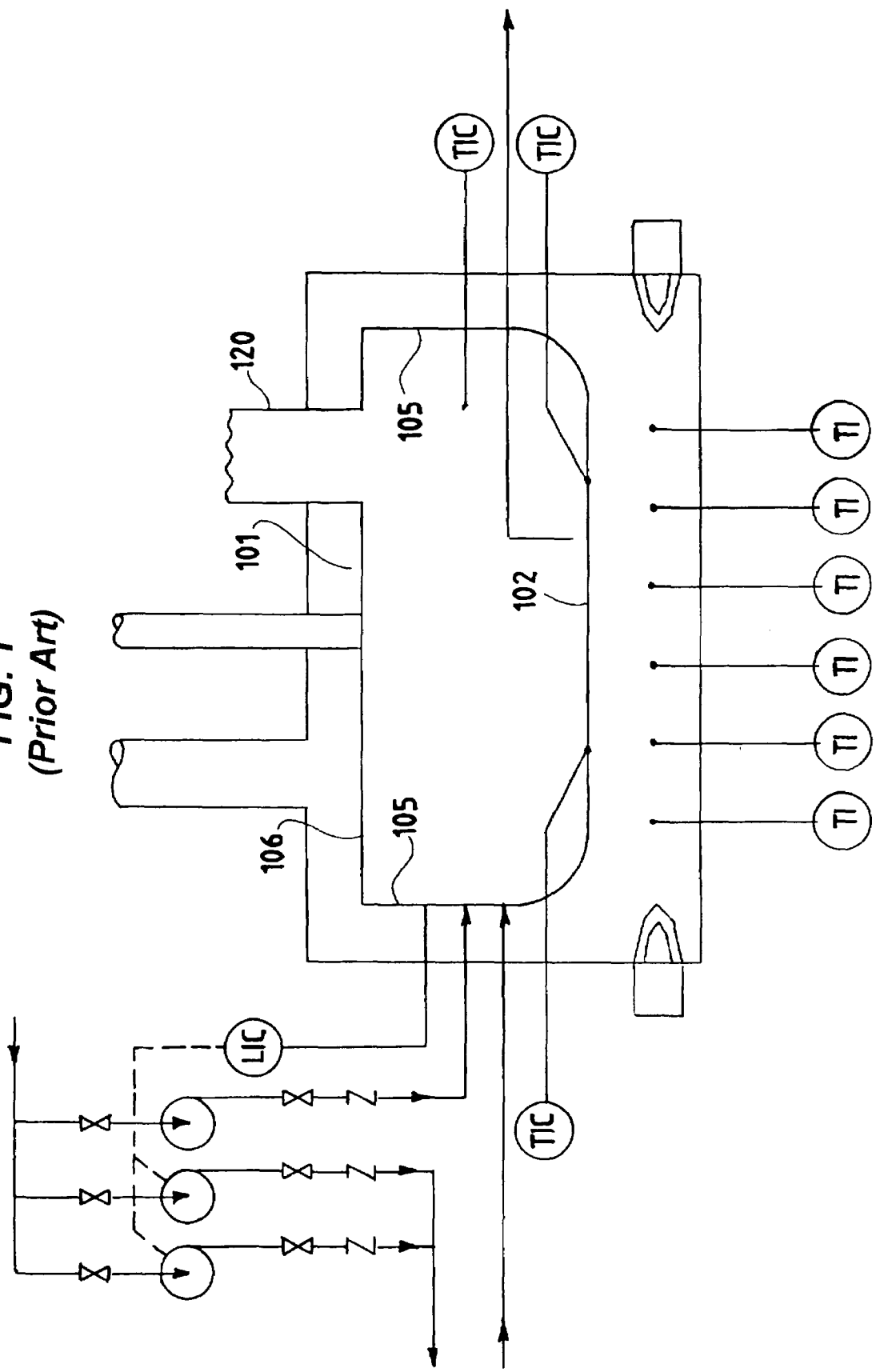
FIG. 1 describes a partial diagram showing a conventional thermal cracking apparatus.
Figure 2:
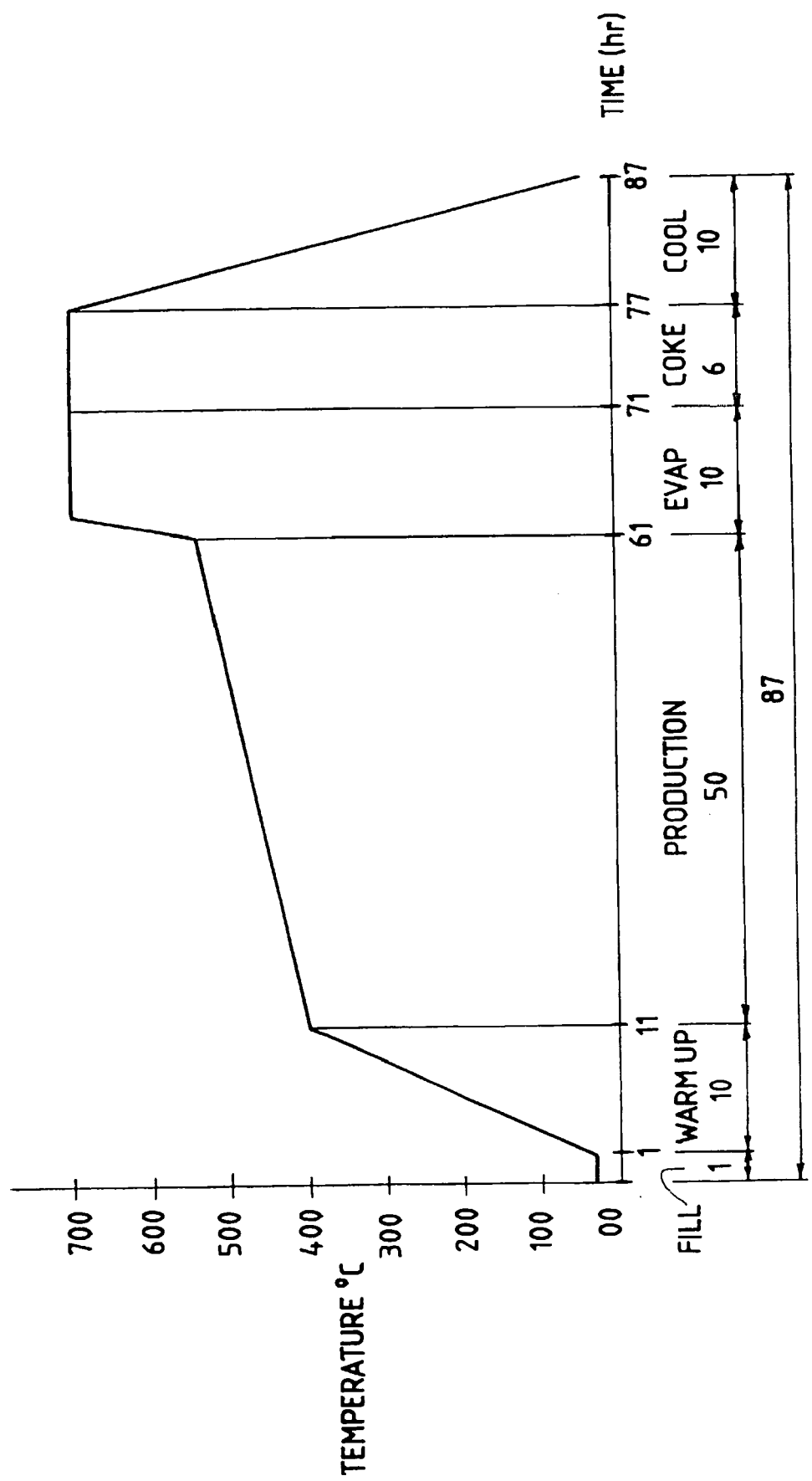
FIG. 2 shows a time versus temperature profile during a production process cycle performed in the conventional thermal cracking apparatus.
Figure 3:
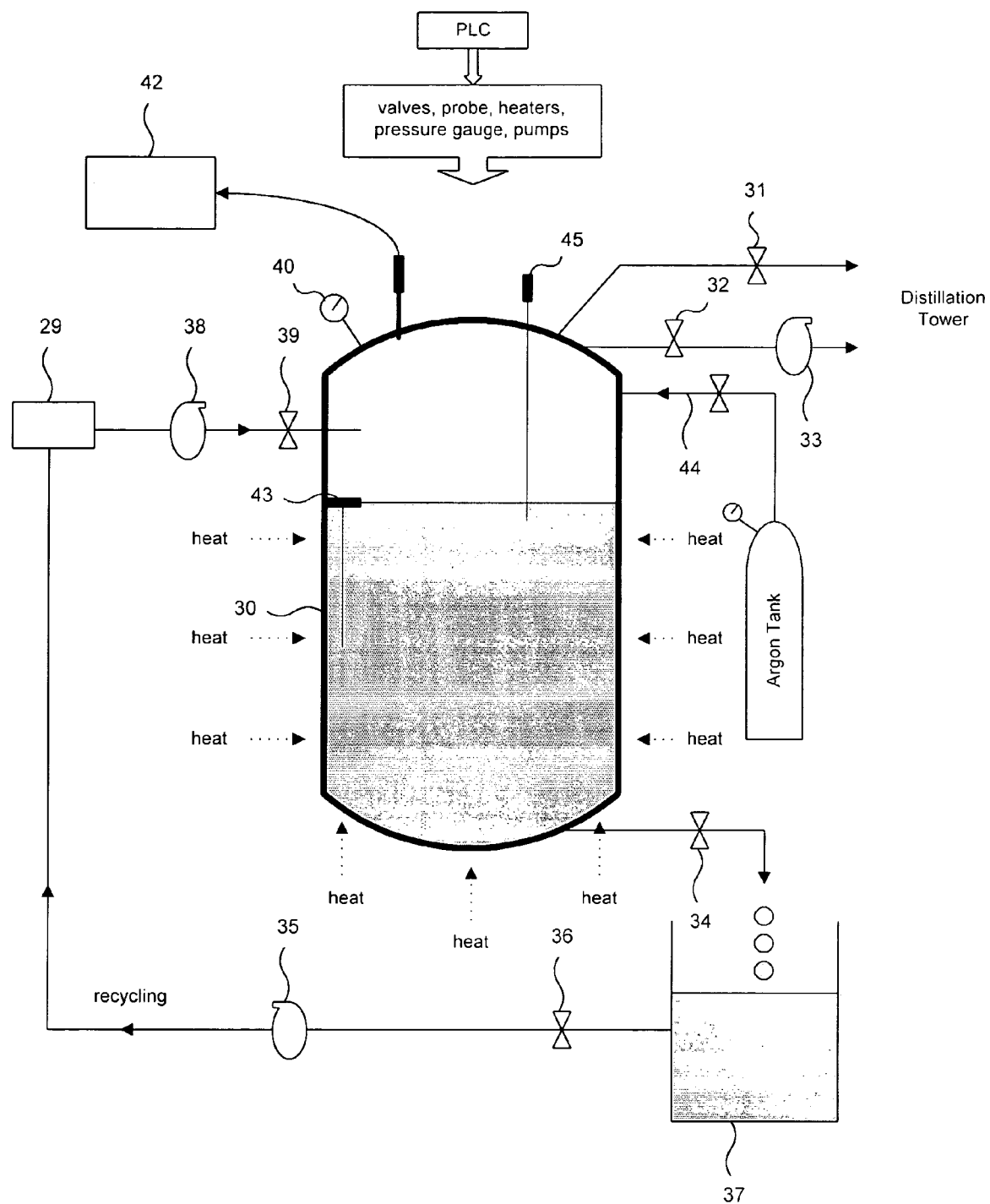
FIG. 3 shows an advanced process and an apparatus which employs pressure and vacuum conditions according to an embodiment of the present invention.

FIG. 3 shows an advanced process and an apparatus which employs pressure and vacuum conditions according to an embodiment of the present invention. Waste oils such as engine oil, metal cutting oil and hydraulic oils contain basically water, solvent and detergents when they are transferred to the oil cracking plant. The water is removed before oils are fed into a thermal cracking vessel 30. Before the oil is pumped, valves 31 and 32 close and a valve 39 opens. The water-free waste oil 29 within a waste oil tank 29 is fed into the thermal cracking vessel 30 using a high-pressure pump 38. The pressure pump 38 increases the pressure inside the vessel 30 up to 50~100 psi at the same time the waste oil is pumped into the vessel 30. Then the vessel can be pre-pressurized again with argon 44 up to 200 psi depending on the circumstance. Heat is directly applied not only to the bottom of the vessel 30 but also to the side of pre-pressurized vessel 30. It is desirable to pre-pressurize the vessel 30 with argon 44 up to 100~150 psi for the acceleration of reaction before heat is applied to the vessel 30.

When the temperature reaches about 200° C. then the pressure valve 31 slightly opens to release any trapped air in the vessel 30 to the atmosphere and closes. A valve connected to an argon tank may open up to compensate the loss of pressure. The temperature continues to increase up to 300~350° C. which takes about 1.0~1.5 hrs when the waste oil starts to crack and generates low molecular weight hydrocarbons of high boiling point, which increases the pressure and makes the valve 31 opens which is fully controlled by PLC. Optimization of pre-pressurization is an important factor in determining the ratio of pressure and temperature that could vary depending on the size of vessel and contents of waste oil. Generally 70~80% fill-up of waste oil in the vessel is desirable. Welding grade of argon is used only at the beginning of each semi-continuous cycle to increase the pressure of the vessel and accordingly increase the cracking reaction rate. The pressure increases as the cracking process proceeds due to the formation of high boiling point of low molecular weight hydrocarbons.

In case of emergency such as generation of excessive internal pressure inside the vessel 30, a rupture valve 41 mounted on the top of the vessel 30 can be blown up by the excessive pressure, and the internal pressure with some of the hot waste oil escapes to a safety tank 42 physically apart from the main thermal cracking vessel 30. This would prevent any fire or explosion. Therefore, a pressure gauge 40 needs to be monitored during the whole process or it can be connected to PLC where automatic shutdown can be performed.

The cracked oil, low molecular hydrocarbons of low boiling point, in the form of gas is released to the distillation tower and condenser for further clean-up process. This cracking process at elevated temperature and pressure continues until about 50% of the waste oil is removed from the vessel which takes about 1.5 hours. A level gauge 43 or float level indicator can be used to take reading of the residual waste oil level in the cracking vessel 30.

During the pressure mode of cracking process, a bleeding valve 34 controlled by a PLC continues to open to let the ash cake being solidified at the bottom of the cracking vessel 30 slowly flow down to a storage tank 37. The waste oil at the top portion of the tank 37 is recycled back to the fresh waste oil tank 29 after passing through a valve 36 and a pump 35, and the bottom portion of the tank 37 is boiled or spray dried for making a solid ash cake.

When 50% of the waste oil is cracked and distilled from the vessel 30, the pressure mode is switched to vacuum mode. The valve 31 slowly and completely opens for depressurization of the vessel 30. The heaters (not shown) uniformly distributed around the vessel 30 should be turned off since the temperature in the range of 300~350° C. is still high enough for the vacuum process to make the 50% residual cracked oil boil and this process is often desirable for safety purpose. When the vessel 30 is depressurized by fully opening the valve 31 and, the valve 31 is closed and valve 32 opens while a vacuum pump 33 starts. It is recommended to vacuum the vessel 30 at least up to $10^{-6}$ torr.

The residual oil starts boiling as the vacuum pump 33 continues to vacuum the vessel 30, which not only accelerates removal of cracked oil in the vessel 30 but also increases reaction rate. This step takes about 0.5 hr and finishes up the incomplete cracking process from pressure mode. Vacuum of minimum $10^{-6}$ torr is desirable depending on the temperature of the vessel. During the vacuum mode the bleeding valve 34 is closed until the next pressure mode.

When about 20% of the residual oil in the cracking vessel 30 is usually removed by vacuum mode then the vacuum pump 33 shuts off and the valve 39 opens up to remove vacuum pressure in the vessel 30. Therefore, when consequently about 70% of waste oil goes through thermal cracking process and is distilled from the vessel 30 by sequential pressure and vacuum modes, the whole process repeats again by filling up the vessel 30 with fresh makeup waste oil as shown in FIG. 4.

Figure 4:
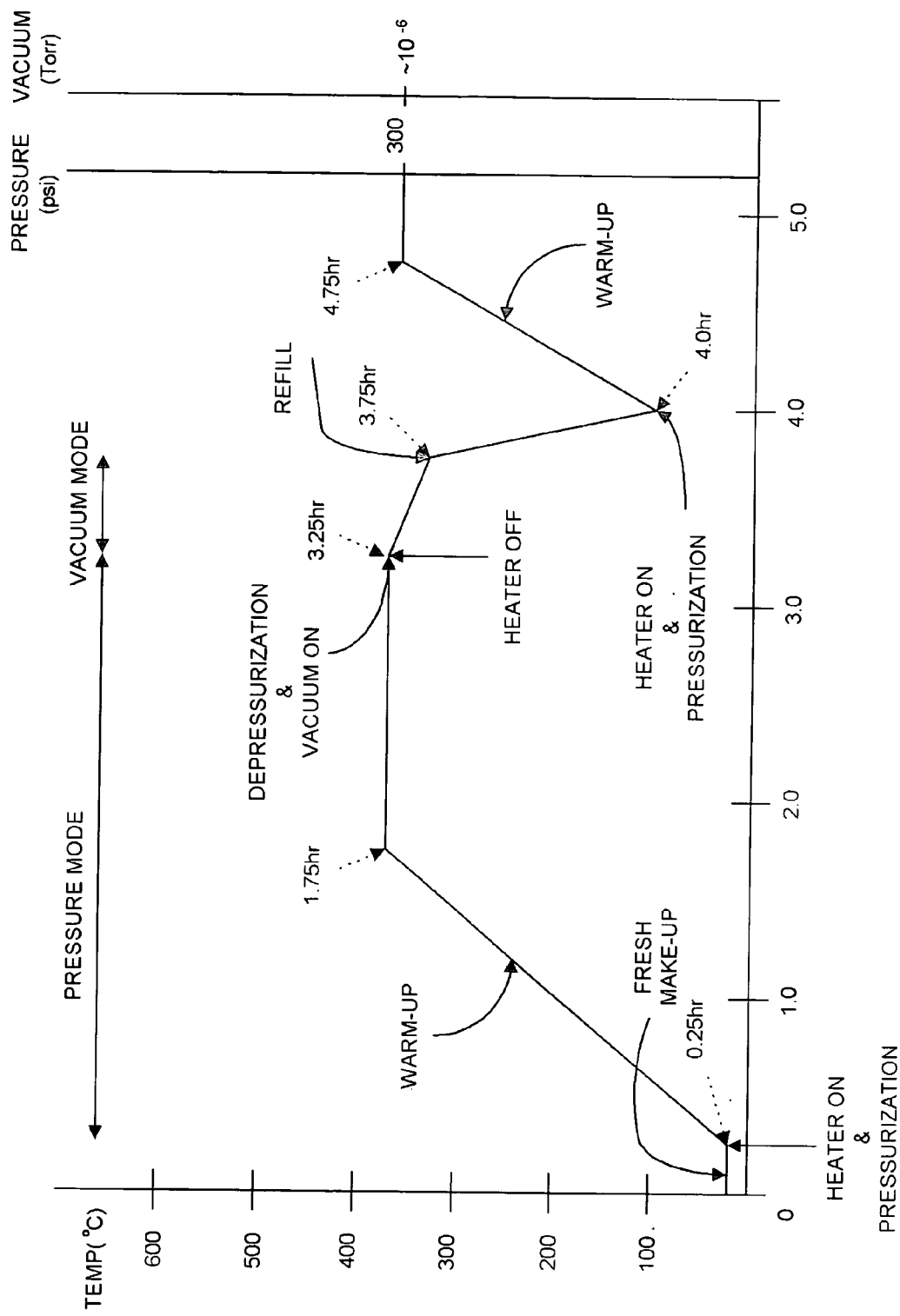
FIG. 4 shows process conditions such as time, temperature and reaction time during a production process cycle according to an embodiment of the present invention.

FIG. 4 explains profile among temperature, pressure and reaction time during the process according to an embodiment of the present invention. Referring to FIG. 4, it shows 4.0 hr of total reaction time. The size of vessel and waste oil contents are 2,500 L and 1,800 L, respectively, which means 72% of full. Its output volume is 1,800 L~1,900 L which is about the same or a bit more than input volume due to the volume increase in depolymerization process despite of formation of sludge cake and tar. This shows 2.9 times better production than from the batch type experience in U.S. Pat. No. 5,871,618.

Another option in this operation is that vacuum mode can be preceded for removal of any gas including oxygen in the waste oil before pressure mode takes place, which could avoid of any earlier oxidation problem during the cracking process. Oxidation is considered as a main source of tar formation.

A PLC controls all actions of valves, heater, gauge and pump in shown in FIG. 3. The probes are connected with PLC for proper monitoring as well.

Table 1 shows typical analysis of feedstock waste oil and product oil.

TABLE 1

|  | Waste Oil | Product Oil |
|---|---|---|
| Water (%) | 6.00 | 0.05 |
| Ash (%) | 2.47 | <0.01 |
| Sulfur (%) | 0.213 | 0.069 |
| Carbon (%) | 83.02 | 82.65 |
| Hydrogen (%) | 14.26 | 13.23 |
| Nitrogen (ppm) | 489 | 98.5 |
| Specific Gravity, 24/25° C. | 0.905 | 0.807 |
| Specific gravity, 15/15° C. | 0.909 | 0.819 |

TABLE 1-continued

|  | Waste Oil | Product Oil |
|---|---|---|
| Ignition point (° C.) | 42 | 38 |
| Density-API | 24.23 | 40.39 |
| Heating Value (BTU/lb) | 18963 | 19631 |
| Color-ASTM | NA | 2.5 |

In summary, the features and advantages of the present invention are as follows.

1) A semi-continuous waste oil cracking apparatus comprising of single pressure and vacuum vessel.

2) A min 3 times of accelerated reaction rate or production rate is achieved by using combination of pressure and vacuum.

3) About $1/6^{th}$ size of vessel is used comparing with the size of batch type cracking vessel running at atmospheric pressure.

4) Reduction of energy required for heating the cracking vessel is achieved by using comparatively small size vessel.

5) Reduction of size of vessel reduces not only warming-up time but also reaction time.

6) Bleeding process removes the pause step which has been necessary with batch type vessel to remove solidified ash cake at the bottom of the cracking vessel.

7) Accordingly no need of agitation for prevention of formation of solid ash cake at the bottom of vessel which removes the need of impeller agitator.

8) Reduction of heating temperature down to 300~350° C. is accomplished by using high pressure.

9) Removal of different temperature zone in the cracking vessel due to uniform application of heat around the vessel.

10) Reduction of formation of sludge cake due to uniform application of heat around the cracking vessel.

11) Increased distillation is achieved by using vacuum process.

12) The vacuum process reduces cracking time and increases production rate.

Although the preferred embodiment of the present invention has been disclosed for illustrative purposes, those skilled in the art will appreciate that various modifications, additions and substitutions can be made without departing from the scope and spirit of the invention as defined in the accompanying claims.

What is claimed is:

1. A process for reclaiming fuel oil from waste oil, comprising the steps of:
   (a) increasing the pressure inside a thermal cracking vessel up to 50~100 psi by feeding waste oil to the thermal cracking vessel using a high pressure pump;
   (b) heating the thermal cracking vessel until the temperature inside the thermal cracking vessel reaches about 200° C.;
   (c) slightly opening the thermal cracking vessel to release any trapped air in the vessel to the atmosphere and closing the vessel;
   (d) heating the thermal cracking vessel to maintain the temperature inside the thermal cracking vessel at a constant value in the range of 300~350° C. until about 50% of the waste oil is removed from the vessel by thermal cracking;
   (e) stopping heating and depressurizing the thermal cracking vessel at least up to $10^{-6}$ torr; and
   (f) removing vacuum pressure inside the thermal cracking vessel when about 70% of the waste oil goes through thermal cracking.

2. The process according to claim 1, further comprising the step of pre-pressurizing the thermal cracking vessel up to 100~150 psi using argon gas before the (b) step.

3. The process according to claim 1, wherein the waste oil is filled up 70~80% of the thermal cracking vessel volume in the (a) step.

4. The process according to claim 1, wherein the bottom of the thermal cracking vessel slightly opens to remove solidifying ash cake during the (a)~(d) steps.

* * * * *